(12) United States Patent
Biebach et al.

(10) Patent No.: US 9,590,516 B2
(45) Date of Patent: Mar. 7, 2017

(54) GALVANICALLY ISOLATED DC/DC CONVERTER AND METHOD OF CONTROLLING A GALVANICALLY ISOLATED DC/DC CONVERTER

(75) Inventors: Jens Biebach, Tutzing (DE); Kay Peschke, Tutzing (DE)

(73) Assignee: L-3 Communications Magnet-Motor GMBH, Stamberg (DE)

( * ) Notice: Subject to any disclaimer, the term of this patent is extended or adjusted under 35 U.S.C. 154(b) by 331 days.

(21) Appl. No.: 14/128,306

(22) PCT Filed: Jun. 24, 2011

(86) PCT No.: PCT/EP2011/060614
§ 371 (c)(1),
(2), (4) Date: Aug. 18, 2014

(87) PCT Pub. No.: WO2012/175142
PCT Pub. Date: Dec. 27, 2012

(65) Prior Publication Data
US 2014/0355311 A1    Dec. 4, 2014

(51) Int. Cl.
*H02M 3/335* (2006.01)

(52) U.S. Cl.
CPC ... *H02M 3/33553* (2013.01); *H02M 3/33584* (2013.01)

(58) Field of Classification Search
CPC ... H02M 3/33584; H02M 2007/53878; H02M 3/285
See application file for complete search history.

(56) References Cited

U.S. PATENT DOCUMENTS

| | | | |
|---|---|---|---|
| 6,574,125 B2 * | 6/2003 | Matsukawa | H02M 3/33569 363/132 |
| 7,936,573 B2 * | 5/2011 | Yamauchi | B60L 11/1868 363/16 |
| 2003/0002304 A1 * | 1/2003 | Zhu | H02M 1/34 363/56.02 |

(Continued)

FOREIGN PATENT DOCUMENTS

| EP | 1 677 410 | 7/2006 |
|---|---|---|
| WO | 2007/122268 | 11/2007 |

OTHER PUBLICATIONS

International Search Report in corresponding application PCT/EP2011/060614, pp. 1-2, dated Feb. 8, 2012.

*Primary Examiner* — Harry Behm
(74) *Attorney, Agent, or Firm* — Brinks Gilson & Lione

(57) ABSTRACT

A galvanically isolated DC/DC converter includes a first and a second side converter circuit coupled between a pair of first side DC terminals and a pair of second side DC terminals, respectively. The first side converter circuit has a first and a second switching element, each including a switch and a diode. When the DC/DC converter is in power transfer operation from the second side DC terminals to the first side DC terminals, the second side converter circuit alternates between two power transfer states. A conductive state of the diode of one of the first and second switching elements is the result of one of the two power transfer states. The first side converter circuit is controlled such that the switch of the respectively other of the first and second switching elements is closed for an adaptation interval before the one of the two power transfer states starts.

27 Claims, 8 Drawing Sheets

(56) References Cited

U.S. PATENT DOCUMENTS

2003/0198064 A1* 10/2003 Zhu .................. H02M 3/33576
                                                            363/21.01
2008/0074905 A1    3/2008 Moiseev et al.

* cited by examiner

GALVANICALLY ISOLATED DC/DC CONVERTER AND METHOD OF CONTROLLING A GALVANICALLY ISOLATED DC/DC CONVERTER

RELATED APPLICATIONS

The present application claims the benefit under 35 U.S.C. §371 of International Patent Application No. PCT/EP2011/060614, having an international filing date of Jun. 24, 2011, the content of which is incorporated herein by reference in its entirety.

FIELD

The present application relates to DC/DC converters.

BACKGROUND

DC/DC converters are in widespread use today. A typical application example is the coupling of a DC power source to a rechargeable battery for charging the same via the DC/DC converter with a desired voltage.

A previous approach DC/DC converter is shown in FIG. 1. Therein, a pair of first side terminals 10 is coupled to a first side converter circuit 20, which in turn is coupled to a transformer circuit 30, which in turn is coupled to a second side converter circuit 240, which in turn is coupled to a pair of second side DC terminals 60. Via the transformer circuit 30, galvanic isolation between the pair of first side DC terminals 10 and the pair of second side terminals 60 is achieved.

Both of the first side converter circuit 20 and the second side converter circuit 240 comprise an H bridge circuit. Each H bridge circuit comprises four switching elements. Each switching element is depicted to have a switch and a reverse directed diode in parallel.

In a case where power is transferred from the pair of second side DC terminals 60 to the pair of first side DC terminals 10, power is transferred in two different power transfer states. As the power flow is from the pair of second side DC terminals 60 to the pair of first side DC terminals 10, this power flow direction is also referred to as a reverse power transfer, with the two power transfer states being also referred to as reverse power transfer states. In a first power transfer state, switches 242 and 248 are closed, and a current flow through the two diodes 23 and 29 in the first side converter circuit 20 is established. In a second power transfer state, switches 244 and 246 are closed, and a current flow through the two diodes 24 and 26 in the first side converter circuit 20 is established. The DC/DC converter 2 is controlled to alternate between these two power transfer states, transferring power through the transformer circuit 30 in a galvanically isolated manner.

In previous approach DC/DC converters, the response time of the first side converter circuit with respect to the second side converter circuit entering one of the first and second power transfer states has not been satisfying. To the contrary, there have been issues with undesired voltage peaks in the first side converter circuit as a response to a switching of power transfer states in the second side converter circuit.

SUMMARY

Accordingly, it would be beneficial to provide a galvanically isolated DC/DC converter and a method of controlling a galvanically isolated DC/DC converter that improve the power absorption properties of the first side converter circuit during a power transfer from the pair of second side DC terminals to the pair of first side DC terminals.

This problem is solved by the galvanically isolated DC/DC converter in accordance with claim 1.

The claimed galvanically isolated DC/DC converter comprises at least one first side converter circuit coupled between a pair of first side DC terminals, the first side converter circuit having at least a first and a second switching element, with each of the first and second switching elements comprising a switch and a diode connected in parallel, and at least one second side converter circuit coupled between a pair of second side DC terminals, wherein, when the DC/DC converter is in power transfer operation from the pair of second side DC terminals to the pair of first side DC terminals, the second side converter circuit is adapted to alternate between two power transfer states, wherein a conductive state of the diode of one of the first and second switching elements is the result of one of the two power transfer states, with the first side converter circuit being controlled such that the switch of the respectively other of the first and second switching elements is closed for an adaptation interval prior to a beginning of the one of the two power transfer states.

The wording to alternate between two power transfer states is not to be understood in a way that at any given point in time one of the first and second power transfer states has to be present. There are generally intervals of no power transfer between the intervals of the first and second power transfer states. The galvanic isolation may be implemented by a transformer being coupled between the first side converter circuit and the second side converter circuit.

The timing relationship between the power transfer states and the closing times of the switches can alternatively be described as follows. The conductive state of the diode of the first switching element of the first side converter circuit is the result of the first power transfer state. The first side converter circuit is controlled such that the switch of the second switching element is closed for the adaptation interval prior to the beginning of the first power transfer state. The conductive state of the diode of the second switching element of the first side converter circuit is the result of the second power transfer state. The first side converter circuit is controlled such that the switch of the first switching element is closed for the adaptation interval prior to the beginning of the second power transfer state.

The conductive state of the diode of the first switching element is a direct consequence of the first power transfer state being present. Accordingly, the duration of the conductive state of the diode of the first switching element is substantially equal to the interval of the first power transfer state. Analogously, the conductive state of the diode of the second switching element is a direct consequence of the second power transfer state being present. Accordingly, the duration of the conductive state of the diode of the second switching element is substantially equal to the interval of the second power transfer state.

The first and second switching elements may be coupled in series between the pair of first side DC terminals. The connection point between the first and second switching elements may be coupled to one end of the first side transformer winding of a transformer coupling the first side converter circuit and the second side converter circuit.

The current established during the adaptation interval allows for a smooth onset of the current flow through the first side converter circuit at the beginning of a respective power transfer state. In particular, the closing of the switch of the first switching element gives rise to a current flow through the first side converter circuit from the high potential terminal of the first side DC terminals to the low potential terminal of the first side DC terminals. After the switch of the first switching element is opened, this current flow commutates in a way to flow through the diode of the second switching element towards the high potential terminal of the first side DC terminals. In this way, a current flow through the diode of the second switching element is already present when the second power transfer state is entered. Accordingly, the second switching element is pre-conditioned, such that the current flow, which is to be induced by the second power transfer state, has already been started before the onset of the second power transfer state.

In particular, the parasitic capacitances of the diode of the second switching element, especially the junction capacitance of the diode of the second switching element, are partially or completely charged during the adaptation interval. The first side converter circuit does therefore not exhibit an undesirably high impedance at the onset of the first power transfer state. Also, the first side converter circuit alone comprises less parasitic connection inductances than the first side converter circuit and the second side converter circuit together, such that the transfer of the diode of the second switching element into a conductive state can be done by above described pre-conditioning with no or less overvoltages as compared to when caused by the second side converter circuit. The current flow through the diode of the second switching element starts smoothly, and no overvoltages are induced at the parasitic inductances of the first side converter circuit.

The same smooth current flow behavior is achieved for the first power transfer state in an analogous manner.

The DC/DC converter may comprise a control circuit, which is configured to control the at least one first side converter circuit and the at least one second side converter circuit. In particular, the control circuit may be configured to generate a first side converter control signal, which controls each of the first and second switching elements of the first side converter circuit such that a closed state of the respective switch is present during the adaptation interval. The control circuit may further be configured to generate a second side converter control signal controlling the at least one second side converter circuit to be in the first power transfer state or in the second power transfer state or in a state of no power transfer.

According to a further embodiment, the first side converter circuit is an H bridge circuit, which comprises the first and second switching elements and further comprises a third and a fourth switching element, with each of the third and fourth switching elements comprising a switch and a diode in parallel, wherein a conductive state of the diodes of two of the first to fourth switching elements is the result of one of the two power transfer states, with the first side converter circuit being controlled such that the switches of the respectively other two of the first to fourth switching elements are closed for the adaptation interval prior to the beginning of the one of the two power transfer states.

In other words: the conductive state of the diodes of the first and fourth switching elements is the result of the first power transfer state. The first side converter circuit is controlled such that the switches of the second and third switching elements are closed for the adaptation interval prior to the beginning of the first power transfer state. The conductive states of the diodes of the second and third switching elements are the result of the second power transfer state. The first side converter circuit is controlled such that the switches of the first and fourth switching elements are closed for the adaptation interval prior to the beginning of the second power transfer state.

Accordingly, the fourth switching element is controlled to behave like the first switching element, and the third switching element is controlled to behave like the second switching element.

The diodes of the respective two of the first to fourth switching elements which are conductive at the same time form a diagonal of the H bridge circuit. In this way, the current flow through the first side transformer winding of the transformer and through the first side converter circuit transfers power to the pair of first side DC terminals.

Accordingly, the same control signals are applied to the first and fourth switching elements as well as to the second and third switching elements. The H bridge is comprised of four identical switching elements. It is, however, also possible that the third and fourth switching elements are replaced with capacitors. In this way, the first and second switching elements are the only switching elements in the first side converter circuit.

According to a further embodiment, the second side converter circuit is adapted to be in a state of no power transfer between the two power transfer states, with the adaptation interval being during the state of no power transfer. In this way, the first side converter circuit can be pre-conditioned for the upcoming power transfer during a time frame where no current flow is induced from the second side converter circuit. Accordingly, the pre-conditioning can be controlled accurately, while only a small amount of energy has to be invested for pre-conditioning the first side converter circuit.

According to a further embodiment. the first side converter circuit is controlled such that the adaptation interval ends a preset commutation time before the beginning of the one of the two power transfer states. In this way, it is ensured that the current flow through the first side converter circuit commutes without disturbance from the switch(es) of the first and, if present, fourth switching elements to the diode(s) of the second and, if present, third switching elements as well as from the switch(es) of the second and, if present, third switching elements to the diode(s) of the first and, if present, fourth switching elements, before the respective power transfer state is entered.

According to a further embodiment, the preset commutation time is chosen such that the conductive state of the diode of the one of the first and second switching elements is present at the beginning of the one of the two power transfer states. In other words, the preset commutation time is at least long enough that it accounts for the switching delay of the diodes. In particular, it is long enough that the parasitic capacitances of the respective diode(s) are charged and the current flow through the respective diode(s), induced from the second side converter circuit, starts at the latest with the beginning of the respective power transfer state.

According to a further embodiment, the adaptation interval has a preset duration. In this way, the control efforts for controlling the first side converter circuit are kept low. The duration of the adaptation interval is the same for all operating conditions. The preset duration of the adaptation interval may be chosen in a way that voltage peaks within the first side converter circuit are reduced in an optimized manner for the operating point of the DC/DC converter that would yield the highest voltage peaks within the first side converter circuit without closing the respective switches during the adaptation interval. In this way, it is ensured that the undesired voltage peaks are kept at an acceptable limit even for the operating conditions most disadvantageous for the first side converter circuit.

According to a further embodiment, a duration of the adaptation interval is dependent on the operating point of the DC/DC converter. In this way, a current flow of a desired magnitude can be generated during the adaptation interval. This current flow, after commutating to the respective diode (s), will then have a desired magnitude at the onset of the respective power transfer state. Depending on the voltage at the pair of second side DC terminals, the voltage at the pair of first side DC terminals, the particular circuit configuration and other factors, the induced current at the onset of a power transfer state may vary. By making the adaptation interval dependent on the current operating conditions, the optimized power transfer onset behavior may be implemented well over a wide range of operating scenarios.

According to a further embodiment, each of the switches of the first side converter circuit is an insulated-gate bipolar transistor. With insulated-gate bipolar transistors, high voltages, such as between 400 V to 800 V across the first side DC terminals may be supported. For high voltages, accordingly dimensioned insulated-gate bipolar transistors are cheaper than accordingly dimensioned MOSFETs, such that the DC/DC converter can be manufactured at a much more affordable price.

According to a further embodiment, the first side converter circuit has voltage source characteristics. The first side converter circuit may comprise a first side capacitor for providing the voltage source characteristics. The voltage source behavior allows for a current flow from the high potential terminal to the low potential terminal of the first side DC terminals during the adaptation interval that becomes a current flow from the low potential terminal to the high potential terminal of the first side DC terminals after the adaptation interval.

According to a further embodiment, the second side converter circuit has current source characteristics. The current source characteristic may stem from one or more circuit elements, such as one or more inductance elements present in each second side converter circuit. With the second side converter circuit having current source characteristic, the design may be matched to the first side converter circuit and the transformer circuit having voltage source characteristics. The DC/DC converter as a whole may thus comprise at least one element with current source characteristic in combination with element(s) causing voltage source characteristic, allowing a stable continuous operation.

According to a further embodiment, the second side converter circuit has two parallel branches between the pair of second side DC terminals, each branch comprising an inductance element and a second side switching element. In this case, the transformer, which couples the first side converter circuit and the second side converter circuit, may be coupled between the two connection points of the two parallel branches, i.e. between the respective connection points of the second side switching elements and the inductance elements. In particular, the conduction direction of the diodes of the second side switching elements may be from the low potential terminal of the second side DC terminals towards the connection point of the respective branch. In each of the two power transfer modes, the current flow through the second side converter circuit goes through a second side switching element in one of the two branches, the transformer and the inductance element of the respectively other branch. The arrangement of the second side converter circuit allows for a low component realization thereof, requiring only two second side switching elements and two inductance elements. Also, this topology allows for the control signals of the second side switching elements being related to a common ground and for a simple transformer topology.

According to a further embodiment, the second side converter circuit is an H bridge circuit or a transformer center tapped circuit having at least two second side switching elements. These circuits may be coupled as second side converter circuits alternatively to the circuit having two parallel branches described above. A transformer center tapped circuit comprises an inductance element between a center point of the second side transformer winding and the low potential terminal of the second side DC terminals, while the two ends of the second side transformer winding are coupled to the high potential terminal of the second side DC terminals via a respective second side switching element.

In all of the topologies of the second side converter circuit described above, the orientation of the second side switching elements may be reversed, leading to a switching of the high and low potential terminals of the second side DC terminals.

According to a further embodiment, each of the second side switching elements is a MOSFET. MOSFETs can be used well in application scenarios having a comparably low voltage across the pair of second side DC terminals without generating an unacceptable voltage drop in relation to the voltage across the pair of second side DC terminals. Using a MOSFET, the internal parasitic body diode thereof may be used or an additional discrete diode may be connected in parallel to the MOSFET. In the latter case, an additional Schottky diode may be connected in series with the MOSFET to help in blocking the action of the internal parasitic body diode of the MOSFET.

According to a further embodiment, the second side converter circuit has at least two second side switching elements, with each of a first one and a second one of the second side switching elements comprising a switch and a diode connected in parallel, wherein, when the DC/DC converter is in forward power transfer operation from the pair of first side DC terminals to the pair of second side DC terminals, the diodes of the first one and the second one of the second side switching elements are alternately in a conductive state, with each of the first one and the second one of the second side switching elements being controlled such that a closed state of the respective switch extends beyond a transitioning of the diode of the same second side switching element from the conductive state to a blocking state.

In the forward power transfer operation from the pair of first side DC terminals to the pair of second side DC terminals, the first side converter circuit is controlled to alternate between a first and a second forward power transfer state. This is not to be understood in a way that at any given point in time one of the first and second forward power transfer states has to be present. There may be intervals of no power transfer between the intervals of the first and second forward power transfer states.

In the first forward power transfer state, the diode of the first one of the second side switching elements is in a conductive state. The conductive state is a direct consequence of the first forward power transfer state being present. Accordingly, the duration of the conductive state of the diode of the first one of the second side switching elements is substantially equal to the interval of the first forward power transfer state. During the first forward power transfer state, a charge is built up at the diode of the first one of the second side switching elements.

For at least a portion of the time the diode of the first one of the second side switching elements is in the conductive state, the switch of the first one of the second side switching elements is controlled to be in a conductive state. When the first forward power transfer state is controlled to end, the diode of the first one of the second side switching elements leaves the conductive state. As stated above, the switch of the first one of the second side switching elements is controlled to remain in the conductive state for the transitioning of the diode of the first one of the second side switching elements from the conductive state to the blocking state.

After the end of the first forward power transfer state, the transitioning from the conductive state to the blocking state of the diode of the first one of the second side switching elements is caused by the voltage across the pair of second side DC terminals, which apply a reverse voltage to said diode. Parasitic charges, especially charges at the junction capacitance of the diode of the first one of the second side switching elements, are removed, giving rise to a reverse current as compared to the current through said diode during the first forward power transfer state. This reverse current, which is also referred to as discharge current, would stop abruptly, which is also referred to as diode cutoff, and the parasitic inductances, which work to maintain this reversed current, would lead to voltage peaks without keeping the switch of the first one of the second side switching elements closed. Keeping said switch closed results in easing the impact of diode cutoff through providing a parallel conductive path. Therefore, the voltage peaks of previous approach implementations that were dangerous to the semiconductor elements of the second side converter circuit may be prevented or kept at an acceptable limit.

The extension of the closed state of the switch within the respective second side switching element eliminates the need for further circuit components for preventing the voltage peaks. While previous approaches arranged further diodes in series and in parallel with the second side switching elements in order to avoid the voltage peak problem, the described behavior compensates for the detrimental dynamic properties of the diodes of the second side switching elements by the control of the respectively associated switches. In this way, the number of circuit components is kept low, which keeps the cost of the DC/DC converter and electric losses during the operation of the DC/DC converter low.

The operation in the second forward power transfer state is analogous. When the first side converter circuit is controlled to be in the second forward power transfer state, the diode of the second one of the second side switching elements is in the conductive state. For at least a portion of the duration of the conductive state of the diode of the second one of the second side switching elements, the switch of the second one of the second side switching elements is in a conductive state as well. When the second forward power transfer state is controlled to end and the diode of the second one of the second side switching elements transfers from the conductive state to a blocking state, the switch of the second one of the second side switching elements is controlled to remain in the closed state beyond the conductive state of the diode of the second one of the second side switching elements.

The DC/DC converter may comprise a control circuit, which is configured to control the at least one first side converter circuit and the at least one second side converter circuit. In particular, the control circuit may be configured to generate a first side converter control signal controlling the at least one first side converter circuit to be in the first forward power transfer state or in the second forward power transfer state or in a state of no power transfer. The control circuit may further be configured to generate a second side converter control signal, which controls each of the first one and the second one of the second side switching elements of the second side converter circuit such that a closed state of the respective switch extends beyond a transitioning of the diode of the same second side switching element from the conductive state to a blocking state.

According to a further embodiment, the respective switch of each of the first one and the second one of the second side switching elements is controlled to condition a slope of a discharge current of the diode of the same second side switching element during the transitioning thereof from the conductive state to the blocking state. In particular, the slope of the discharge current may be conditioned to not have an abrupt ending. The respective switch of each of the first one and the second one of the second side switching elements may have an adjustable resistance. A charge is built up at the diode during the conductive state. The built-up charge leads to the discharge current, which is also referred to as reverse current, when the diode is transferred into the blocking state. In previous approaches, when the switch was closed prior to the diode entering the blocking state, an uncontrolled ending of this reverse current led to unacceptable voltage peaks. By controlling the current slope of the reverse current by the respective switch, the reverse current is confined, such that the voltage peak can at least be kept at an acceptable limit. By conditioning the discharge current slope, the negative effects of the diode cutoff may be dealt with via the control of the switch of the respective second side switching element in an optimized manner.

The control of the second side switching elements in such a way that the magnitude of the reverse current of the respective diode is conditioned can be reached in various ways. This may for example be done by controlling the channels of the MOSFETs to have a particular resistance. The respective switch may still be closed, but exhibit the particular resistance along its channel. In this way, the discharge process may also be adapted to different usage or application scenarios, such as different times of no power transfer between the two forward power transfer states.

According to a further embodiment, each of the first one and the second one of the second side switching elements is controlled such that the respective switch is in the conductive state during substantially the whole time the diode of the same second side switching element is in the conductive state. In this way, the benefit of reducing the resistance of the second side switching elements through the provision of two parallel conductive elements, namely the diode and the switch, is used during substantially the whole time of the respective forward power transfer state. The term substantially the whole time is understood to include the case that the switch is brought to the conductive state a delay time after the diode enters the conductive state. Such a delay time may be provided to prevent short circuit connections within the second side converter circuit. The delay time may be much shorter than the duration of the conductive state of the diode, in particular it may be less than 10%, more particularly less than 5% of the duration of the conductive state of the diode.

According to a further embodiment, the first side converter circuit is adapted to alternate between two forward power transfer states, wherein each forward power transfer state leads to the conductive state of one of the diodes of the first one and the second one of the second side switching elements, with each of the first one and the second one of the second side switching elements being controlled such that the respective switch is opened a preset lag time after the respective one of the two forward power transfer states is entered that leads to the conductive state of the diode of the other second side switching element. In other words, the first side converter circuit is adapted to impose an alternating current flow in the second side converter circuit, with the second side converter circuit converting the alternating current flow to the DC voltage present at the pair of second side DC terminals. A first direction of the alternating current flow is associated with the conductive state of the diode of the first one of the second side switching elements and a second direction of the alternating current flow is associated with the conductive state of the diode of the second one of the second side switching elements. Accordingly, the first forward power transfer state results in the diode of the first one of the second side switching elements being conductive. The switch of the first one of the second side switching elements is closed, such that the diode and the switch both carry a portion of the current flow. When the first forward power transfer state is ended, a state of no power transfer is generally entered. The diode of the first one of the second side switching elements transitions from the conductive state to the blocking state. The switch of the first one of the second side switching elements is kept closed. From the state of no power transfer, the first side converter circuit enters the second forward power transfer state, as a result of which the diode of the second one of the second side switching elements enters a conductive state. The switch of the first one of the second side switching elements is opened a preset lag time after the second forward power transfer state is entered. As laid out above, the terminology of alternating between two forward power transfer states does not imply that one of these two states is present at any given point in time during the operation of the DC/DC converter. In general, a state of no power transfer is present in between each transition between the two forward power transfer states. However, the duration of the state of no power transfer depends on the particular embodiment of the DC/DC converter and the power to be transferred in the current operation conditions. This duration is therefore variable and may be set to zero in particular embodiments or operating conditions. With the respective switch being opened a preset lag time after the forward power transfer state is entered which leads to the conductive state of the diode of the other of the second side switching elements, it is ensured that at least the preset lag time is dedicated to achieving the discharge at the diode in a desired manner, for example by achieving a controlled reverse current slope at the diode, such that a reduction to acceptable voltage peaks can be achieved under all operating conditions even when the first side converter circuit directly switches between the two forward power transfer states without entering the state of no power transfer therebetween.

According to a further embodiment, the first side converter circuit is adapted to alternate between two forward power transfer states, wherein each forward power transfer state leads to the conductive state of one of the diodes of the first one and the second one of the second side switching elements, with each of the first one and the second one of the second side switching elements being controlled such that the respective switch is closed a preset delay time after the respective one of the two forward power transfer states is entered that leads to the conductive state of the diode of the same second side switching element. In this way, it is ensured that the current flow through the diode is established in the desired direction before the resistance of the respective second side switching element is reduced by closing the respective switch.

According to a further embodiment, the preset delay time is greater than the preset lag time. In this way, it is ensured that only one of the switches of the first one and the second one of the second side switching elements is closed at any given point in time. Accordingly, no short circuit or low resistance connection between the pair of second side terminals is present at any point in time during the forward power transfer. Safe operation is achieved, while it is made possible that the respective diode is discharged during the preset lag time in the case when the first side converter circuit switches directly between the two forward power transfer states or in the case when the first side converter circuit switches between the state of no power transfer and one of the two forward power transfer states.

According to a further embodiment, the second side converter circuit is coupled to a protection circuit. Such a protection circuit may be provided in order to protect the second side converter circuit against voltage peaks and over-voltage, respectively. It may be provided as an alternative to or as a supplement to the extension of the closed state of the switch of the first one and the second one of the second side switching elements beyond the transitioning of the associated diode from the conductive state to the blocking state. In particular, the duration of the closed state of the switch of the first one and the second one of the second side switching elements after the transitioning of the associated diode may be chosen in such a way that the diode charge is effectively discharged and the reverse current slope may be conditioned effectively via the switch in most operating conditions, while the protection circuit ensures safe operation in extreme operating conditions. A desired trade-off between the two protection means can be designed for, such that the provision of the protection circuit gives additional design flexibility.

According to a further embodiment, the second side converter circuit comprises two second side switching elements and the protection circuit comprises a voltage source and two protection diodes coupled to the voltage source, with each of the second side switching elements being coupled to one of the two protection diodes. With the protection diodes and the voltage source, a voltage level may be provided by the protection circuit, to which the first one and the second one of the second side switching elements are coupled. When the voltage at one of the first one and the second one of the second side switching elements exceeds said voltage level, the respective protection diode becomes conductive and the voltage is limited via a current through the respective protection diode to the voltage source.

In case the second side converter circuit has the two parallel branches between the pair of second side DC terminals as described above, the protection circuit may consist only of the voltage source and the two protection diodes. Accordingly, this way of protection may be achieved with a very low number of circuit components, in particular with one voltage source only for reference purposes. In case the second side converter circuit is an H bridge circuit or a transformer center tapped circuit, as described above, a protection circuit may also be implemented. However, one reference voltage source per second side switching element may be needed.

According to a further embodiment, the voltage source is coupled to one of the pair of second side DC terminals or to one of the pair of first side DC terminals. In particular, it may be coupled to the respective low potential terminal. By coupling the voltage source to one of the pair of second side DC terminals or to one of the pair of first side DC terminals, the power removed from the first one or the second one of the second side switching elements due to over-voltage protection can be re-fed into the DC/DC converter system and is not lost. In other words, the coupling of the voltage source allows for power regeneration by transfer of clamped charges to the terminals the protection circuit is coupled to. It can either be re-fed on the first side of the DC/DC converter or on the second side of the DC/DC converter. The second side may be chosen as the sink of the re-fed power when the DC/DC converter is optimized for power transfer from the first side to the second side. The first side may be chosen as the sink of the re-fed power when emphasis is put on particular power flow conditions from the second side to the first side in a bi-directional DC/DC converter, such as the starting of a DC generator coupled to the first side DC terminals using power from a battery coupled to the second side DC terminals. With the voltage source being coupled to the one of the pair of second side DC terminals, the protection branches, respectively consisting of one of the two protection diodes and the voltage source, are in parallel with the first one and the second one of the second side switching elements of the second side converter circuit, respectively. In this way, the power is split up between the respective parallel branches, preventing an over-voltage condition at the first one and the second one of the second side switching elements. It is possible to connect the one of the pair of second side DC terminals or the one of the pair of first side DC terminals, in particular the respective low potential terminal, to ground. In this way, the voltage source is also connected to ground and provides for a stable reference voltage.

It is also possible to couple the voltage source to the first side DC terminals or the second side DC terminals via a transformer for impedance matching. Accordingly, the voltage level defining an over-voltage condition for the first one and the second one of the second side switching elements may be chosen to be different from the operating voltage across the first or second side DC terminals.

The voltage source of the protection circuit may be controlled. In this way, a constant voltage supply is ensured. Charge absorption by the voltage source from the second side converter circuit is controlled therewith, such that this charge does not increase the voltage value of the voltage source. Voltage control may be done via an additional DC/DC converter. In case the voltage source is coupled to the pair of first side DC terminals, galvanic insulation may be provided between the voltage source and the pair of first side DC terminals.

Providing the protection circuit may eliminate the need to provide a conductive path from the high potential terminal to the low potential terminal of the second side DC terminals at all times during the power transfer from the second side DC terminals to the first side DC terminals where the second side converter circuit has current source characteristic. The current pushed by the current source characteristic may be absorbed be the protection circuit. This may give more flexibility in operating conditions when the first side converter circuit is loaded from the second side and is not yet able to process large increments of transferred power before reaching a desired operating point.

According to a further embodiment, the at least one first side converter circuit is a plurality of first side converter circuits connected in series between the pair of first side DC terminals and wherein the at least one second side converter circuit is a plurality of second side converter circuits connected in parallel between the pair of second side DC terminals. In this way, the power transfer may be split up between a plurality of first side converter circuits and a plurality of second side converter circuits, such that each of these converter circuits may be designed for a lower power transfer capability than in the case of only one first side converter circuit and one second side converter circuit. While the provisions of a plurality of converter circuits increases the number of components, reducing the power transfer capacity requirements allows for using cheaper components, such that an overall cheaper design of the DC/DC converter may be achieved. Providing a plurality of converter circuits may extend the application fields of the DC/DC converter to higher power transfer levels, in particular to higher voltage levels.

It is also possible that the DC/DC converter comprises a plurality of first side converter circuits and exactly one second side converter circuit. It is also possible that the DC/DC converter comprises exactly one first side converter circuit and a plurality of second side converter circuits.

According to a further embodiment, the DC/DC converter comprises a plurality of transformers, with each transformer coupling one of the first side converter circuits to one of the second side converter circuits. In other words, the number of first side converter circuits is equal to the number of second side converter circuits. Each of the first side converter circuits is coupled to exactly one second side converter circuit via one transformer circuit. In this way, a plurality of sub-modules is formed each consisting of one first side converter circuit, one transformer and one second side converter circuit. The sub-modules may be designed to account for a certain portion of the maximum power transfer capacity of the DC/DC converter. The number of sub-modules may be 2, 4, 6 or 8, but is not limited thereto.

The plurality of sub-modules can be controlled in the same manner, i.e. with the same control signals. Accordingly, no additional control efforts have to be undertaken in the case of providing multiple sub-modules. The parallel arrangement of the second side converter circuits allows for a balancing effect between the second side converter circuits in case of unequal loading of the sub-modules.

According to a further embodiment, in operation, a desired operating voltage across the pair of first side DC terminals may be at least 10 times greater than an operating voltage across the pair of second side DC terminals. The term desired operating voltage across the pair of first side DC terminals is understood to be the operating voltage across the pair of first side DC terminals that the DC/DC converter is controlled for. In other words, the desired operating voltage across the pair of first side DC terminals may be one control goal of the control algorithm of the DC/DC converter.

According to a further embodiment, in operation, a desired operating voltage across the pair of first side DC terminals is between 400V and 800V, preferably between 500V and 700V.

According to a further embodiment, in operation, an operating voltage across the pair of second side DC terminals is between 10V and 40V, preferably between 20V and 30V.

With these voltage levels, the DC/DC converter may be used for converting the DC voltage supplied by a rechargeable battery coupled to the second side DC terminals for starting or supporting a DC generator coupled to the first side DC terminals. The re chargeable battery may provide DC voltage to other devices at a voltage level common in vehicles. The DC/DC converter may be used bi-directionally. Therefore, it is possible to use the power generated by the DC generator for re charging the battery. The DC generator may be driven by a combustion motor, such as a Diesel engine.

Above mentioned problem is further solved by the method of controlling a galvanically isolated DC/DC converter in accordance with claim 28.

The claimed method of controlling the galvanically isolated DC/DC converter, which comprises at least one first side converter circuit coupled between a pair of first side DC terminals and at least one second side converter circuit coupled between a pair of second side DC terminals, wherein the first side converter circuit has at least a first and a second switching element, with each of the first and second switching elements comprising a switch and a diode connected in parallel, and wherein the second side converter circuit is controlled to alternate between two power transfer states for transferring power from the pair of second side DC terminals to the pair of first side DC terminals, the method comprising the steps of (a) operating the second side converter circuit in one of the two power transfer states, with the one of the two power transfer states leading to the diode of a particular one of the switching elements to be in a conductive state, (b) ending the one of the two power transfer states and putting the second side converter circuit in a state of no power transfer, (c) closing the switch of the particular one of the switching elements for an adaptation interval, and (d) putting the second side converter circuit in the other one of the two power transfer states, with the other one of the two power transfer states leading to the diode of the other one of the switching elements to be in a conductive state. The method steps (a), (b), (c) and (d) are carried out in the order given.

The same advantages may be achieved with the claimed method of controlling the galvanically isolated DC/DC converter as with the galvanically isolated DC/DC converter as described above. It is pointed out that the embodiments and further features described above with respect to the galvanically isolated DC/DC converter are equally applicable to the method of controlling a galvanically isolated DC/DC converter in an analogous manner. It is again pointed out that alternating between two power transfer states does not mean that one of these two power transfer states is present at any given point in time. Instead, a state of no power transfer is generally present between the two power transfer states when switching from one power transfer state to the other.

According to a further embodiment, step (d) takes place a preset commutation time after an end of the adaptation interval.

According to a further embodiment, an amount of power transfer is controlled by a duration of the two power transfer states. In other words, the amount of power transfer is controlled by a duration of a state of no power transfer between the two power transfer states when switching therebetween.

According to a further embodiment, the second side converter circuit has at least two second side switching elements, with each of a first one and a second one of the second side switching elements comprising a switch and a diode connected in parallel, wherein the first side converter circuit is controlled to alternate between two forward power transfer states for transferring power from the pair of first side DC terminals to the pair of second side DC terminals, the method comprising the steps of (k) putting the first side converter circuit in one of the two forward power transfer states, with the one of the two forward power states leading to a particular one of the diodes of the first one and the second one of the second side switching elements to be in a conductive state, (l) closing the switch of the second side switching element which comprises the particular diode, (m) terminating the one of the two forward power transfer states, and (n) opening the closed switch after the particular diode has transitioned from the conductive state to a blocking state. The method steps (k), (l), (m) and (n) are carried out in the order given.

The DC/DC converter as a whole may be controlled in such a way that the first side converter circuit is controlled to alternate between the two forward power transfer states for forward power transfer or that the second side converter circuit is controlled to alternate between the two power transfer states for reverse power transfer or that no power transfer is present in the DC/DC converter. Accordingly, there may be operating times of forward power transfer, operating times of reverse power transfer and operating times of no power transfer, yielding a bi-directional DC/DC converter.

According to a further embodiment, the method further comprises between steps (m) and (n) the step of (m') putting the first side converter circuit in the other one of the two forward power transfer states, with step (n) taking place a preset lag time after step (m').

According to a further embodiment, step (l) takes place a preset delay time after step (k). According to a further embodiment, the preset delay time is greater than the preset lag time.

According to a further embodiment, an amount of power transfer is controlled by a duration of the two forward power transfer states.

It is explicitly pointed out that the nomenclature of a first side and a second side, of a forward power transfer operation and a reverse power transfer operation are not intended to be limiting in any way. They are used for distinguishing between the two operating directions of a bi-directional DC/DC converter. However, depending on the particular implementation of the invention and the particular circuit topology of the DC/DC converter, these power transfer directions may be called differently. Only the interdependencies between the control of the DC/DC converter and the circuit structure as claimed matters in this context. It is further explicitly pointed out that, within the scope of the invention, a DC/DC converter may be a unidirectional DC/DC converter, wherein only the power transfer direction from the second side to the first side, in the nomenclature used herein, is implemented. Also, the DC/DC converter may be a bi-directional DC/DC converter, with only the power transfer direction from the second side to the first side being implemented as described herein and the power transfer direction from the first side to the second side being implemented differently from what is described herein.

BRIEF DESCRIPTION OF THE DRAWINGS

The invention is described in more detail below with regard to the exemplary embodiments shown in the accompanying figures, in which.

DETAILED DESCRIPTION OF THE PREFERRED EMBODIMENTS

Figure 2:
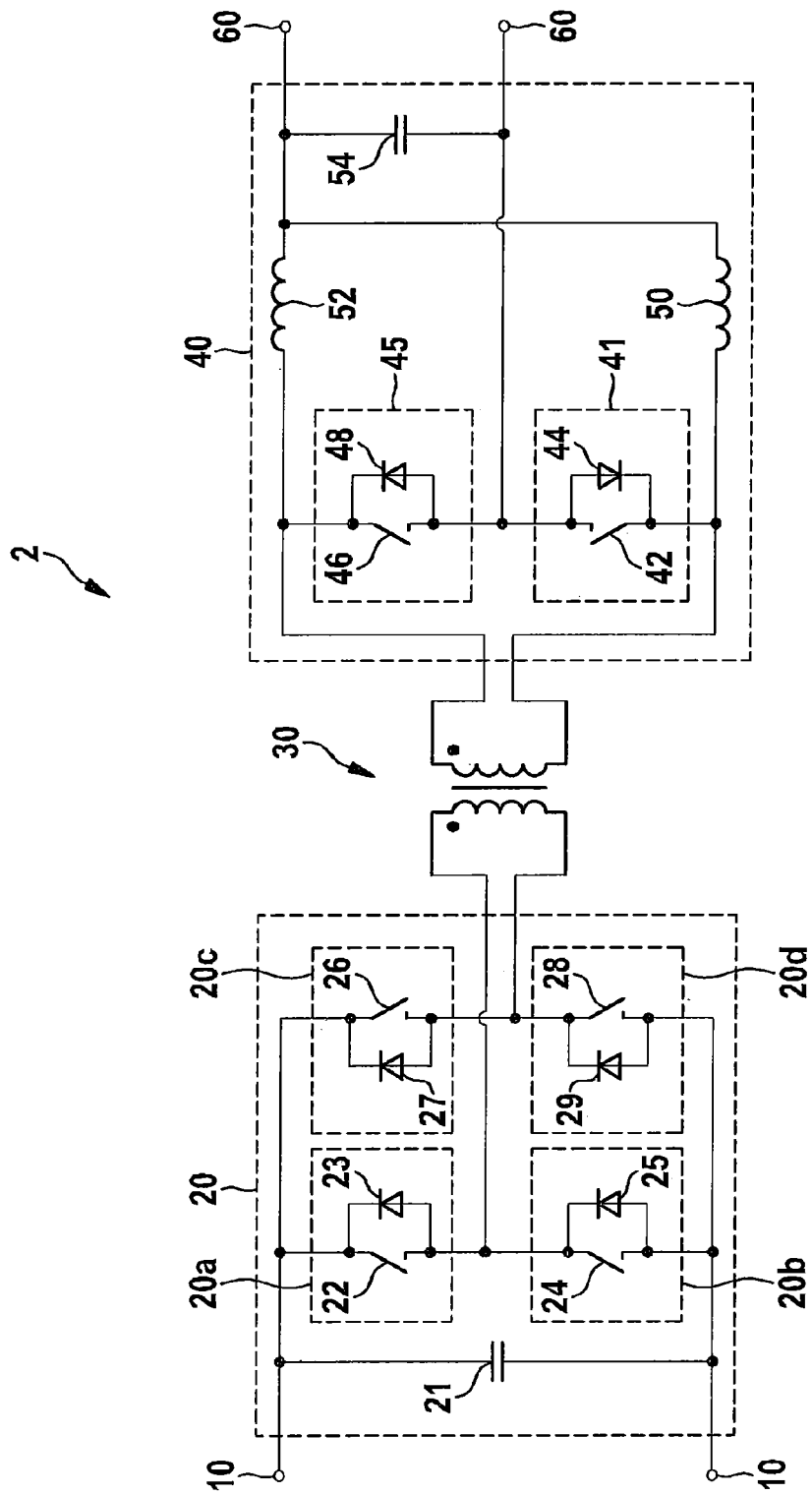
FIG. 2 shows a circuit diagram of a DC/DC converter according to an exemplary embodiment of the invention.

FIG. 2 shows a circuit diagram of a DC/DC converter according to an exemplary embodiment of the invention. The DC/DC converter 2 comprises a pair of first side DC terminals 10 and a pair of second side DC terminals 60. The DC/DC converter 2 further comprises a first side converter circuit 20, a transformer 30 and a second side converter circuit 40, which jointly couple the pair of first side DC terminals 10 to the pair of second side DC terminals 60. In particular, the pair of first side DC terminals 10 is coupled to the first side converter circuit 20, which in turn is coupled to the transformer 30, which in turn is coupled to the second side converter circuit 40, which in turn is coupled to the pair of second side DC terminals 60.

The first side converter circuit 20 comprises an H bridge circuit having four insulated-gate bipolar transistors (IGBTs) and four diodes. In particular, the first IGBT 22 is coupled in parallel with the first diode 23, the second IGBT 24 is coupled in parallel with the second diode 25, the third IGBT 26 is coupled in parallel with the third diode 27, and the fourth IGBT 28 is coupled in parallel with the fourth diode 29. The first and second IGBTs 22, 24 are coupled in series between the pair of first side DC terminals 10, with the center point being coupled to one end of the first side transformer winding of the transformer 30. Equally, the third and fourth IGBTs 26, 28 are coupled in series between the pair of first side DC terminals 10, with the center point being coupled to the other end of the first side transformer winding of the transformer 30. In addition, a first side capacitor 21 is coupled between the pair of first side DC terminals 10. The respective combinations of IBGT and diode, i.e. IGBT 22/diode 23, IBGT 24/diode 25, IGBT 26/diode 27, and IGBT 28 I diode 29, are also referred to as switching elements of the first side converter circuit or as first side switching elements 20a, 20b, 20c, and 20d.

The second side converter circuit 40 comprises two parallel branches between the pair of second side DC terminals 60. A first branch comprises a first inductive element 50 and a first MOSFET 41. A second branch comprises a second inductive element 52 and a second MOSFET 45. The connection point between the first inductance element 50 and the first MOSFET 41 is coupled to one end of the second side transformer winding of the transformer 30. The connection point between the second inductance element 52 and the second MOSFET 45 is coupled to the other end of the second side transformer winding of the transformer 30. The first and second MOSFETs 41, 45 are each depicted as consisting of a switch, i.e. the channel of the MOSFET, and a parasitic diode, which is oriented anti-parallel to the respective switch. In particular, the first MOSFET 41 comprises the switch 42 and the diode 44. The second MOSFET 45 comprises the switch 46 and the diode 48. Accordingly, the parallel circuit of switch and diode is a possible circuit symbol representation of a MOSFET component. Also, a second side capacitor 54 is coupled between the pair of second side DC terminals 60.

Figure 3:
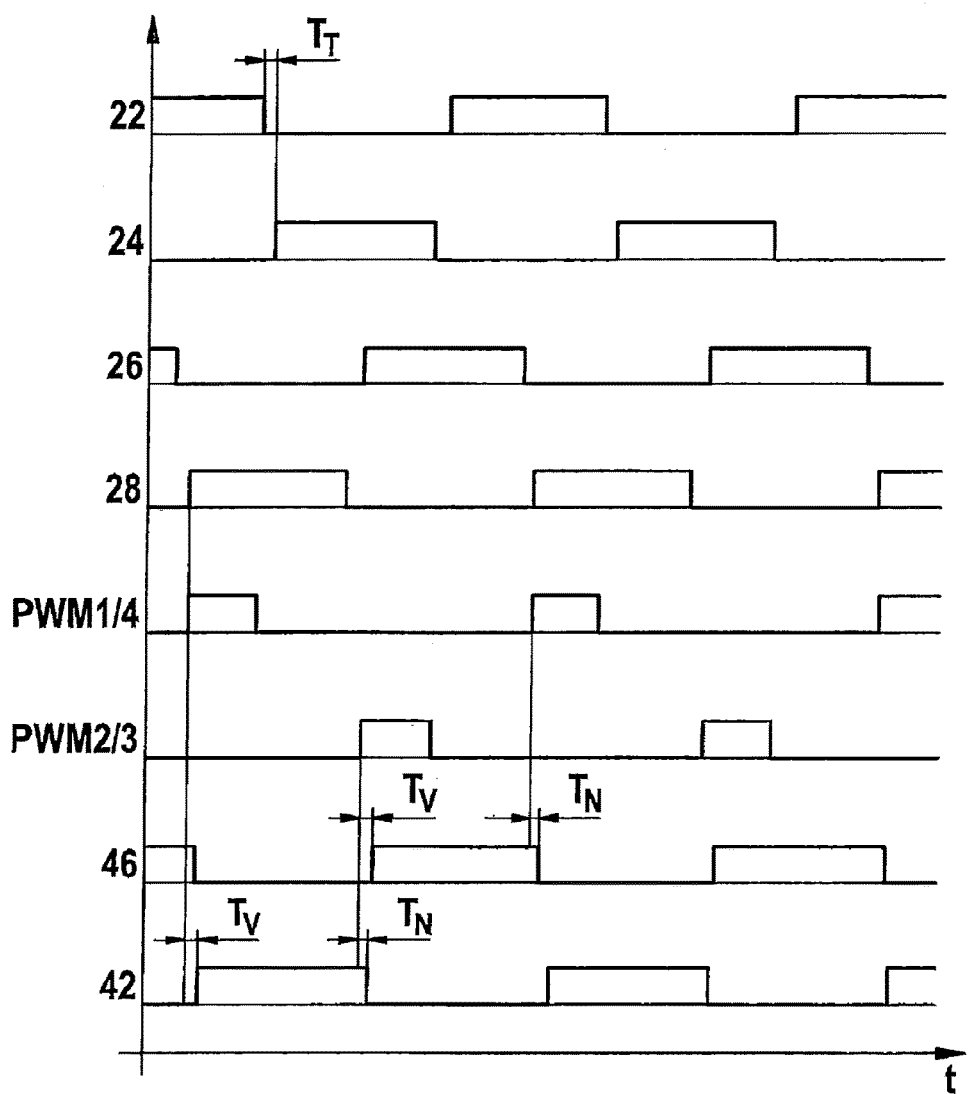
FIG. 3 shows a timing diagram of the control signals applied to the DC/DC converter for a power transfer from the first side to the second side according to an exemplary embodiment of the invention.

The operation of the DC/DC converter 2 for a power transfer from the pair of first side DC terminals 10 to the pair of second side DC terminal 60, i.e. a forward power transfer, is explained with reference to the timing diagram of FIG. 3. FIG. 3 shows the relative timing of the control signals applied to the first to fourth IGBTs 22, 24, 26 and 28 as well as to the switches 42 and 46 of the first and second MOSFETs 41, 45. It is also shown the time of the presence of the first forward power transfer state PWM1/4 and the second forward power transfer state PWM2/3, which will be described below. A high state means that the respective IGBT or the switch of the respective MOSFET is controlled to be conductive at the depicted point in time.

The timing diagram of FIG. 3 shows that the first and second IGBTs 22, 24 are alternately put in a conductive state. In particular, each of the first and second IGBTs 22, 24 is in a conductive state for almost 50% of the time. In order to avoid a 15 short circuit condition between the pair of first side DC terminals 10, a down time $T_T$ is established, wherein both the first and second IGBTs 22, 24 are open. Accordingly, the first and second IGBTs are never closed at the same point in time. The third and fourth IGBTs 26, 28 are controlled in a corresponding manner. That is, each of the third and fourth IGBTs 26, 28 is conductive for almost 50% of the time, with none of the third and fourth IGBTs 26, 28 being conductive during the downtime $T_T$ for avoiding short circuit conditions.

Whenever the first IGBT 22 and the fourth IGBT 28 are in a conductive state, a current flow from the high potential terminal, depicted on top, of the pair of the DC terminals 10 through the first IGBT 22, through the first side transformer winding of the transformer 30, through the fourth IGBT 28 to the low potential terminal, depicted at the bottom, of the first side DC terminals 10 is established. This current flow flows through the first side transformer winding of the transformer 30 in a first direction, such that a first forward power transfer state PWM1/4 is established. Correspondingly, whenever the second IGBT 24 and the third IGBT 26 are in a conductive state, a second forward power transfer state PWM2/3 is established. In this case, the current flow flows through the first side transformer winding of the transformer 30 in a second direction. In particular, the current flow is established from the high potential terminal of the pair of first side DC terminals 10 through the third IGBT 26, through the first side transformer winding of the transformer 30, through the second IGBT 24 to the low potential terminal of the pair of the first side DC terminals 10.

The duration of the two forward power transfer states PWM1/4 and PWM2/3 is set by the offset between the control signals for the first and second IGBTs 22, 24 and the control signals for the third and fourth IGBTs 26, 28, as can be seen graphically in FIG. 3. Accordingly, this offset or phase shift between these control signals is used for controlling the amount of power transferred from the pair of first side DC terminals 10 to the pair of the second side DC terminals 60. In this way, the voltage across the second side capacitor 54 can be kept constant for a varying load coupled to the pair of second side DC terminals 60.

The current flow through the first side transformer winding of the transformer 30 in the first forward power transfer state PWM1/4 induces a current flow in the second side transformer winding of the transformer 30, which leads to a current flow from the low potential terminal of the second side DC terminals 60 through the diode 44 of the first MOSFET 41, through the second side transformer winding of the transformer 30, through the second inductance element 52 to the high potential terminal of the pair of second side DC terminals 60. In other words, the first forward power transfer state makes the diode 44 of the first MOSFET 41 enter a conductive state, such that a current path between the pair of second side DC terminal 60 through the second side transformer winding of the transformer 30 is established. The switch 42 of the first MOSFET 41 is closed a preset delay time $T_V$ after the first forward power transfer state PWM1/4 is entered. From that moment on, current flows through both the diode 44 and the switch 42 of the first MOSFET 41, such that the first MOSFET 41 as a whole imposes a lower voltage drop and lower losses, respectively, than the diode 44 alone.

When the first forward power transfer state PWM1/4 ends, the current flow through the first side transformer winding of the transformer 30 ends, which leads to the current flow through the second side transformer winding of the transformer 30 to end and to the diode 44 of the first MOSFET 41 to transition from the conductive state to a blocking state. Although the conduction through the diode 44 stops, the switch 42 of the first MOSFET 41 is kept close. In this way, a connection between the two sides of the diode 44 remains. In this way, a charge built up at the imperfect parasitic diode 44 will not result in an over-voltage condition when the diode 44 transitions to the blocking state. In particular, the switch 42 of the first MOSFET 41 is controlled in a way to condition the current slope of the diode 44 for the transitioning from the conductive state to the blocking state by providing a parallel channel. The conditioning is achieved by controlling the MOSFET 41 in a way to exhibit an appropriate resistance along its channel, i.e. along its switch 42. In this way, the negative impact of over-voltage spikes caused by the discharge of the built-up charge at the diode 44 is eased. In particular, an abrupt ending of the reverse current caused by the built-up charge at the diode 44, which is prone to causing over-voltages at parasitic inductances, which are harmful to the electric components, is prevented.

After an interval of no power transfer, the second forward power transfer state PWM2/3 is entered. The switch 42 of the first MOSFET 41 is opened a preset lag time $T_N$ after the second forward power transfer state PWM2/3 is entered. The second forward power transfer state PWM2/3 makes the diode 48 of the second MOSFET 45 conductive, giving rise to a current flow from the low potential terminal, depicted at the bottom, of the pair of second side DC terminals 60 through the diode 48, through the second side transformer winding of the transformer 30, through the first conductance element 50 to the high potential terminal, depicted on top, of the pair of second side DC terminals 60. The switch 46 of the second MOSFET 45 is closed a preset delay time $T_V$ after the second forward power transfer state PWM2/3 is entered. With the preset delay time $T_V$ being greater than the preset lag time $T_N$, it is ensured, that the switches 42 and 46 of the first and second MOSFET 41 and 45 are not closed at the same point in time during the forward power transfer. Therefore, no short circuit condition between the pair of second side DC terminals 60 can arise.

From here on, the DC converter operates in the second forward power transfer state in a manner analogous to the first forward power transfer state described above. Accordingly, the current through the second MOSFET 45 is split up between the switch 46 and the diode 48 thereof, giving rise to a resistance voltage drop lower than that of the diode 48 itself. When the second forward power transfer state PWM2/3 ends, the diode 48 transitions from the conductive state to a blocking state, while the switch 46 remains closed. In this way, the negative impact of over-voltage spikes caused by the discharge of the built-up charge at the diode 44 is eased. In particular, an abrupt ending of the reverse current caused by the built-up charge at the diode 44, which is prone to causing over-voltages at parasitic inductances, which are harmful to the electric components, is prevented by providing the parallel channel through the switch 46. After an interval of no power transfer, the first forward power transfer state PWM1/4 is entered again. The switch 46 of the second MOSFET 45 is opened the preset lag time $T_N$ after the first forward power transfer state PWM1/4 is entered. And the switch 42 of the first MOSFET 41 is closed a preset delay time $T_V$ after the first forward power transfer state PWM1/4 is entered.

This operation continues with the DC/DC converter 2 alternating between the two power transfer states PWM1/4 and PWM2/3, as long as power transfer from the first side DC terminals 10 to the second side DC terminals 60 is desired.

Figure 4:
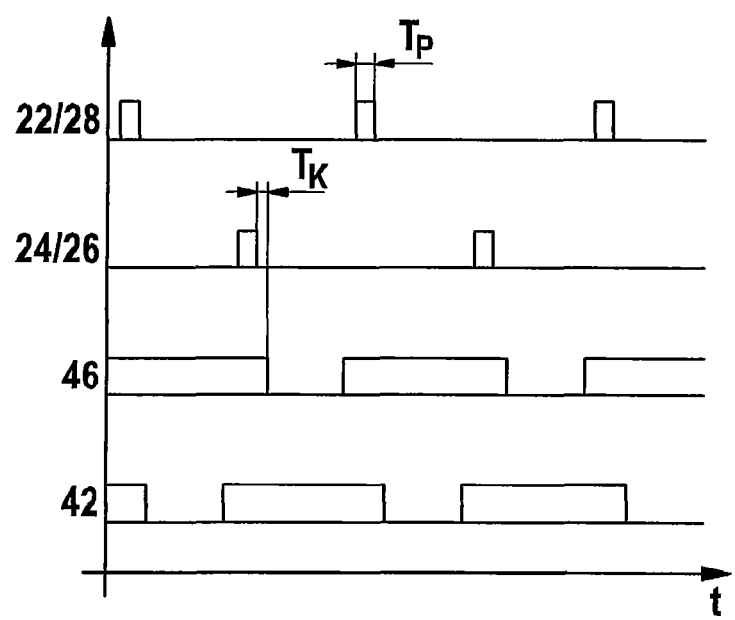
FIG. 4 shows a timing diagram of the control signals applied to the DC/DC converter for a power transfer from the second side to the first side according to an exemplary embodiment of the invention.

The operation of the DC/DC converter 2 of FIG. 2 is described for the power transfer from the pair of second side DC terminals 60 to the pair of first side DC terminals 10 with reference to FIG. 4. FIG. 4 shows a timing diagram of the control signals applied to the first and second MOSFETs 41 and 45 as well as the first to fourth IGBTs 22, 24, 26 and 28. A high state of the respective signals indicates that the respective IGBT or the respective switch 42, 46, i.e. the respective channel, of the MOSFET is controlled to be in a conductive state.

As the case of power being transferred from the second side DC terminals 60 to the first side DC terminals 10 is described, which is also referred to as a reverse power transfer, reference is first made to the second side converter circuit 40 as the source of power for the transformer 30. FIG. 4 shows that both the switch 42 of the first MOSFET 41 and the switch 46 of the second MOSFET 45 alternate between an open and a closed state. It is also shown that both of these switches are closed for more than 50% of the total time. The control signals for the switches 42 and 46 are phase shifted with respect to each other, such that both switches 42 and 46 are never open at the same time. However, the closed state of the switches 42 and 46 overlap. In this way, it is ensured that there always is a conductive path from the high potential terminal of the second side DC terminals 60 to the low potential terminal of the second side DC terminals 60. In this way, the current flow imposed by the first and second inductive elements 50 and 52 can find its way through the second side converter circuit 40 and does not give rise to dangerous voltage peaks in the second side converter circuit 40.

When both the switch 42 and the switch 46 are in a closed state, no current flows through the second side transformer winding of the transformer 30. Accordingly, a state of no power transfer is established. When one of the two switches 42 and 46 is closed, while the other switch is open, a current flow through the second side transformer winding of the transformer 30 is established and power transfer to the first side takes place. Depending which one of the switches 42 and 46 is closed and which one is open, the current flows through the second side transformer winding of the transformer 30 in a respective direction, giving rise to one of two power transfer states. As these power transfer states are associated with the power transfer from the pair of second side DC terminals 60 to the pair of first side DC terminals 10, they are also referred to as reverse power transfer states.

In particular, when the switch 42 of the first MOSFET 41 is closed and the switch 46 of the second MOSFET 45 is open, a current flow from the high potential terminal of the second side DC terminals 60, depicted on top, through the second inductance element 52, through the second side transformer winding of the transformer 30 and through the switch 42 to the low potential terminal, depicted at the bottom, of the second side DC terminals 60 is established. This scenario is referred to as the first reverse power transfer state. It gives rise to a current flow in the first side transformer winding of the transformer 30 and the first side converter circuit 20. In particular, a current flow from the low potential terminal of the first side DC terminals 10, depicted at the bottom, through the fourth diode 29, through the first side transformer winding of the transformer 30 and through the first diode 23 to the high potential terminal of the first side DC terminals 10 is established. In this way, power is transferred to the pair of first side DC terminals in the first reverse power transfer state.

As can be seen from FIG. 4, shortly before the first reverse power transfer state is entered, a control pulse is applied to the second and third IGBTs 24, 26. In other words, the IGBTs 24 and 26 are closed for a duration $T_P$, referred to as an adaptation interval $T_P$, with this adaptation interval $T_P$ ending a commutation time $T_K$ before the first reverse power transfer state is entered. In this way, a current flow through the first side transformer winding of a transformer 30 is generated in the same direction as the current flow that will be present during to first reverse power transfer state. Accordingly, a current flow in the expected direction is already present in the first side transformer winding of the transformer 30 when the first reverse power state is entered.

As can also be seen from FIG. 4, the conductive state of the second and third IGBTs 24, 26 ends a commutation time $T_K$ before the start of the first reverse power transfer state. The commutation time $T_K$ is a preset interval. This preset commutation time $T_K$ allows for the current flow to commutate from its path through the second and third IGBTs 24, 26 to the first and fourth diodes 23, 29. In this way, the first and fourth diodes are put in a conductive state before the onset of the first reverse power transfer state, such that the power transfer experiences a smooth beginning. In particular, the parasitic capacitances of the first and fourth diodes 23, 29 are charged before the beginning of the first reverse power transfer state, such that a favorable impedance is already present for the current induced from the second side converter circuit.

The second and third IGBTs 24, 26 are in a closed state for the adaptation interval $T_P$. The adaptation interval is chosen in such a way that the current flow generated during this interval helps the power transfer in an optimized manner. For this purpose, it is taken into account that the current flow increases in magnitude during the adaptation interval $T_P$, whereas it decreases during the preset commutation time $T_K$. In the particular embodiment of FIGS. 2 and 4, the adaptation interval $T_P$ is chosen in such a way that undesired voltage peaks within the first side converter circuit 20 are kept at a just acceptable limit at the onset of the reverse power transfer state for the case of maximum power transfer from the pair of second side DC terminals 60 to the pair of first side DC terminals 10.

The operation of the DC/DC converter 2 in the second reverse power transfer state is analogous to their first reverse power transfer state described above. While both of the switch 42 of the first MOSFET 41 and the switch 46 of the second MOSFET 45 are closed, first and fourth IGBTs 22 and 28 are put in a conductive state for the adaptation interval $T_P$. This gives rise to a current flow from the high potential terminal of the first side DC terminals 10 through the first IGBT 22, through the first side transformer winding of the transformer 30 and through the fourth IGBT 28 to the low potential terminal of the first side DC terminals 10. The switch 42 of the first MOSFET 41 is opened the preset commutation time $T_K$ after the first and fourth IGBTs 22 and 28 are opened. As a consequence a current flow from the high potential terminal of the second side DC terminals 60 through the first inductance element 50, through the second side transformer winding of the transformer 30 and through the switch 46 of the second MOSFET 45 to the low potential terminal of the first side DC terminals 60 is established. This current flow gives rise to a current flow in the first side transformer winding of the transformer 30 in the same direction as previously established during the adaptation interval $T_P$, which in turn gives rise to a current flow from the low potential terminal of the first side DC terminals 10 through the second diode 25, through the first side transformer winding of the transformer 30 and through the third diode 27 to the high potential terminal of the first side DC terminals 10. In this way, a power transfer from the pair of second side DC terminals 60 to the pair of first side DC terminals 10 is established. With the conditioning of the first side converter circuit 20, this power transfer has a smooth onset, as described above for the first reverse power transfer state.

Another exemplary embodiment of a DC/DC converter 2 in accordance with the invention is described with reference to FIG. 5. The DC/DC converter 2 of FIG. 5 comprises two power transfer sub-modules. The first power transfer sub-module comprises a first side converter circuit 20, a transformer 30 and a second side converter circuit 40. These components are identical to the respective components of FIG. 2 and are therefore designated with the same reference numerals. The second power transfer sub-module comprises a further first side converter circuit 120, a further transformer 130 and a further second side converter circuit 140. These components are also identical to the first side converter circuit 20, the transformer 30 and the second side converter circuit 40 of FIG. 2. Their reference numerals correspond to the reference numerals of the respective components of the DC/DC converter 2 of FIG. 2, with each reference numeral being increased by 100. For brevity, an in-depth discussion of the structure is omitted.

Attention is now drawn to how the first side converter circuits 20, 120 are coupled to the pair of first side DC terminals 10 and to how the second side converter circuits 40 and 140 are coupled to the second side DC terminals 60. In particular, the first side converter circuit 20 and the first side converter circuit 120 are coupled in series between the pair of first side DC terminals 10. In parallel with the series connection of the first side converter circuits 20 and 120, an additional first side capacitor 12 is coupled between the pair of first side DC terminals 10. The second side converter circuit 40 and the second side converter circuit 140 are coupled in parallel between the pair of second side DC terminals 60. Also, an additional second side capacitor 62 is coupled in parallel with the second side converter circuits 40 and 140 between the second side DC terminals 60. As is apparent from basic circuit theory, the second side capacitor 54 of the second side converter circuit 40, the second side capacitor 154 of the second side converter circuit 140 and the additional second side capacitor 62 are arranged in parallel and may therefore be replaced by one single second side capacitor. Also, the additional first side capacitor 12 can be dispensed with if the capacitance values of each of the first side capacitors 21 and 121 is increased by twice the capacitance value of the additional first side capacitor 12, when an equal electric behavior is desired.

Figure 5:
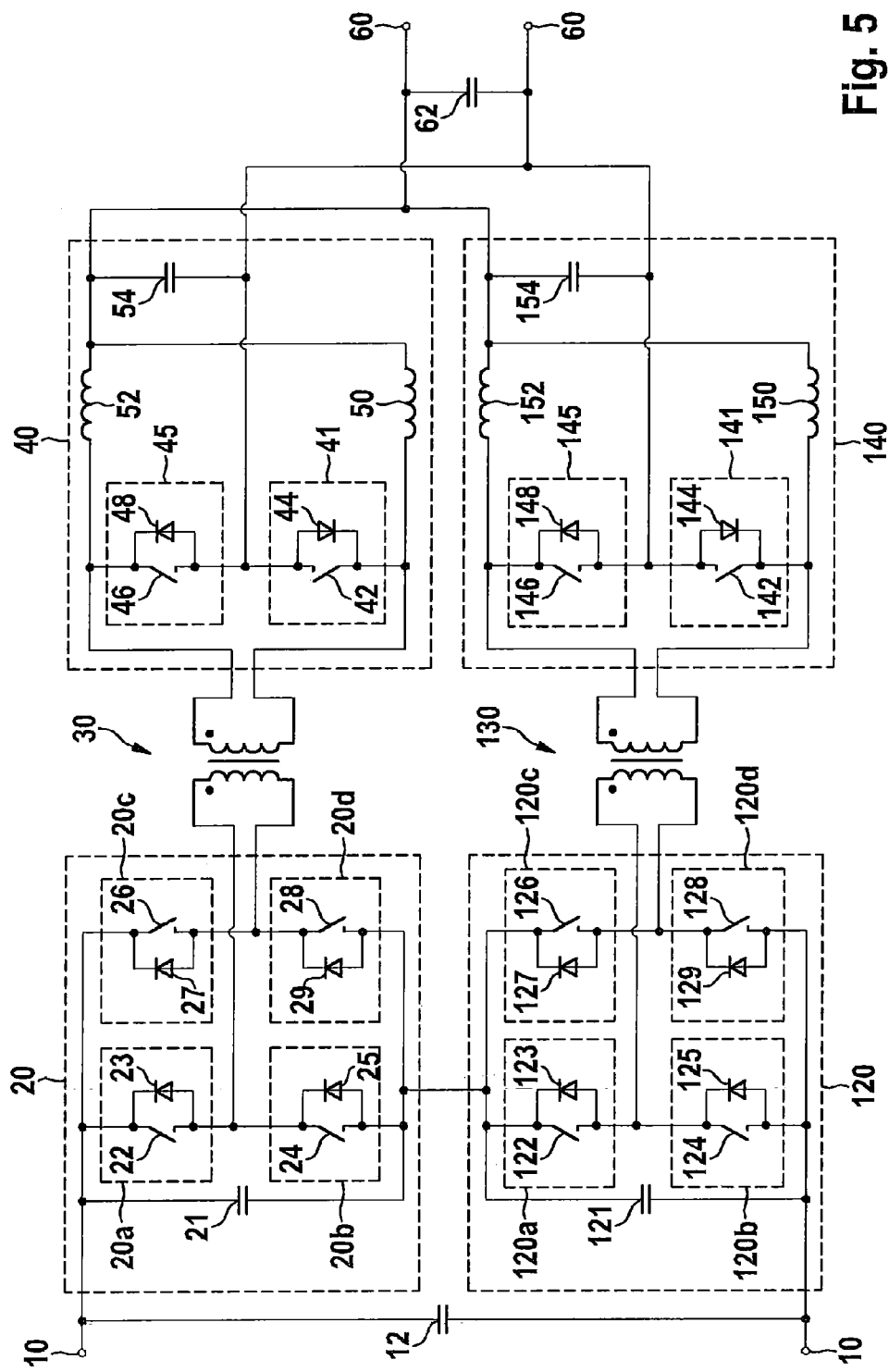
FIG. 5 shows a circuit diagram of a DC/DC converter according to another exemplary embodiment of the invention.

The DC/DC converter 2 of FIG. 5 is controlled via generally the same control signals as the DC/DC converter 2 of FIG. 2. Accordingly, the control signals depicted in FIGS. 3 and 4 can be used without modification for the control of the DC/DC converter 2 of FIG. 5. In case the voltage across the second side DC terminals 60 is controlled, both second side converter circuits 40, 140 may be fed with the same control pattern. In case the voltage across the first side DC terminals 10 is controlled, each sub-module is controlled with its own voltage control loop, which may result in different control patterns for each sub-module, such that any kind of asymmetric behavior between the sub-modules may be compensated for by those individual control patterns.

However, with the first power transfer sub-module and the second power transfer sub-module being identical with regard to their circuit structure, the power amount transfer per sub-module is half of the power amount transferred via the respective components of the DC/DC converter 2 of FIG. 2, assuming an overall equal amount of power transfer. Accordingly, the individual circuits and components have to be dimensioned for half the power transfer capacity. In particular, on the first side, the voltage drop across each one of the first side converter circuits 20 and 120 is halved as compared to the DC/DC converter 2 of FIG. 2, assuming the same total voltage drop across the pair of first side DC terminals 10. Seen from a different angle, greater voltage drops across the first side DC terminals 10 can be supported for a given voltage drop capacity of a first side converter circuit.

With the series connection of the first side converter circuits 20 and 120 and the parallel connection of the second side converter circuits 40 and 140, a large voltage difference between the pair of first side DC terminals 10 and the pair of second side DC terminals 60 can be achieved in a very elegant manner.

Figure 6:
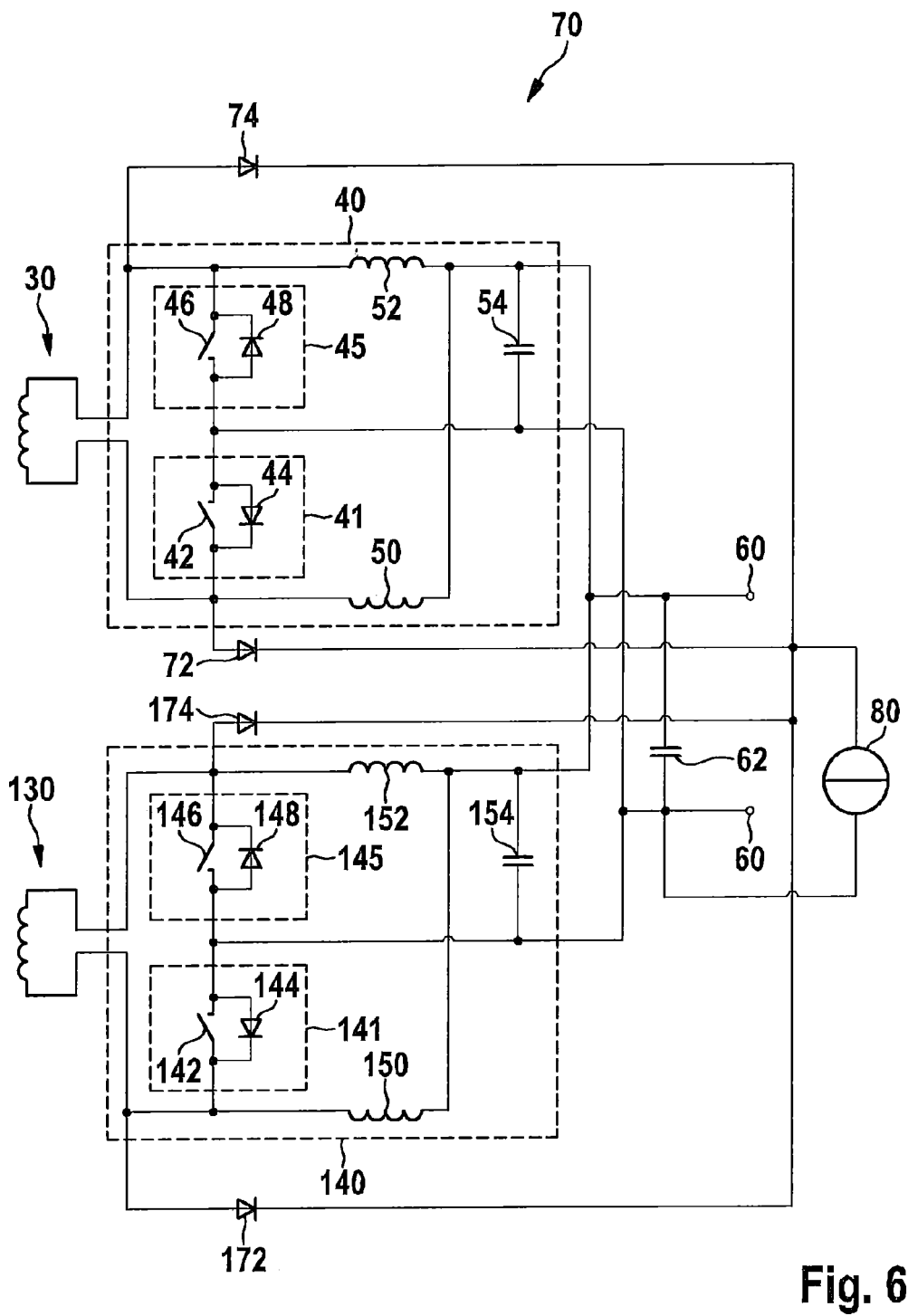
FIG. 6 shows a circuit diagram of a DC/DC converter according to another exemplary embodiment of the invention.

Another exemplary embodiment of the invention is described with regard to FIG. 6. FIG. 6 depicts the right side, i.e. the second side, of the DC/DC converter 2 of FIG. 5 extended by a protection circuit 70. The protection circuit 70 comprises four protection diodes 72, 74, 172 and 174 and a voltage source 80. The first and second protection diodes 72 and 74 are associated with the second side converter circuit 40. The third and fourth protection diodes 172 and 174 are associated with the second side converter circuit 140.

The first protection diode 72 is coupled between the connection point of the first MOSFET 41 and the first inductance element 50 of the first side converter circuit 40 and the voltage source 80. The second protection diode 74 is coupled between the connection point of the second MOSFET 45 and the second inductance element 52 of the second side converter circuit 40 and the voltage source 80. The third protection diode 172 is coupled between the connection point of the first MOSFET 141 and the first inductance element 150 of the first side converter circuit 140 and the voltage source 80. The fourth protection diode 174 is coupled between the connection point of the second MOSFET 145 and the second inductance element 152 of the second side converter circuit 140 and the voltage source 80.

Accordingly, each MOSFET of the second side converter circuits 40 and 140 is coupled to the same one of the terminals of the voltage source 80 of the protection circuit 70 via a respective protection diode. The other terminal of the voltage source 80, i.e. the terminal of the voltage source 80 that is not coupled to the protection diodes, is coupled to the low potential terminal of the pair of second side DC terminals 60. Being connected to the low potential terminal of the pair of second side DC terminals 60, the other terminal of the voltage source 80 is also coupled to the connection point between the first and second MOSFETs 41 and 45 of the second side converter circuit 40 as well as to the connection point of the first and second MOSFETs 141 and 145 of the second side converter circuit 140. In this way, if the voltage across one of the MOSFETs exceeds the voltage of the voltage source 80 plus the forward voltage drop of a protection diode, the protection diode becomes conductive and the voltage across the respective MOSFET is limited to this threshold level via a current through the respective protection diode. In this way, an additional layer of over-voltage protection is provided for the MOSFETs of the second side converter circuits 40 and 140. The voltage source 80 sinks the charge removed from the MOSFET experiencing an over-voltage condition. In the exemplary embodiment of FIG. 6, the voltage source 80 then sinks the charge to the additional second side capacitor 62, such that the power is not removed from the system and dissipated, but fed back into the second side converter circuits.

The voltage value of the voltage source 80 is chosen in such a way that it is greater than or equal to twice the maximum desired operating voltage across the pair of second side DC terminals 60 for the particular DC/DC converter embodiment. In this way, it is ensured that no energy is extracted from the second side converter circuit 40 by the protection circuit 70 in a case where the voltage across the second side DC terminals 60 is still in the desired range for the momentary operating conditions.

It is explicitly pointed out that the protection circuit 70 may equally be applied to the DC/DC converter 2 of FIG. 2 having only one second side converter circuit. In this case, only the first and second protection diodes 72 and 74 as well as the voltage source 80 would be present forming the protection circuit 70. Also, the protection circuit 70 may be present in embodiments having more than two second side converter circuits. In this case, two protection diodes per second side converter circuit are present.

Figure 8:
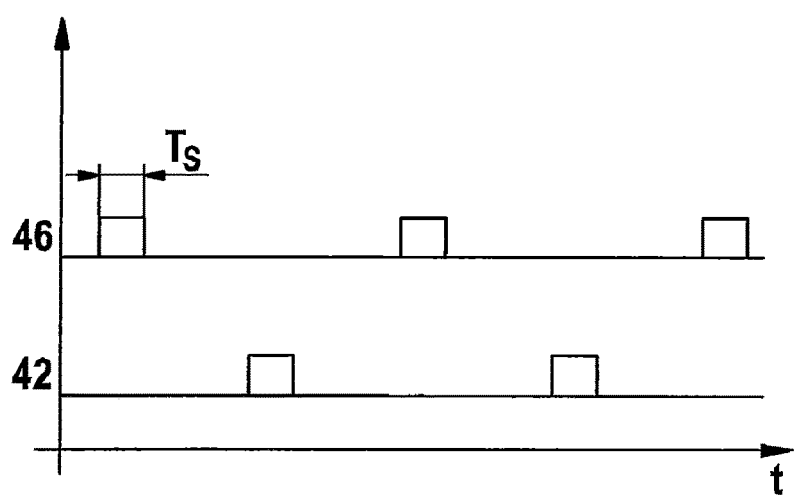
FIG. 8 shows a timing diagram of the control signals applied to the DC/DC converter for a pre-charging operation from the second side to the first side according to an exemplary embodiment of the invention.

With regard to FIG. 8, it is further described a method of pre-charging the first side capacitances via the second side converter circuits 40 and 140 of FIG. 6. Again, this method may equally be carried out in a DC/DC converter having only one second side converter circuit 40. Such a pre-charging may be carried out in order to establish a voltage level across the first side capacitances that ensures that the energy transferred from the pair of second side DC terminals 60 to the pair of first side DC terminals 10 may be properly absorbed on the first side. It may therefore be performed, before the stationary energy transfer from the pair of second side DC terminals 60 to the pair of first side DC terminals 10, as described with regard to the timing diagram of FIG. 4, is carried out.

For this pre-charging, only the switch 42 of the first MOSFET 41 and the switch 46 of the second MOSFET 45 are operated, as shown in FIG. 8. The switch 46 is closed for a charging interval $T_S$. During this interval, a current flow from the high potential terminal of the second side DC terminals 60 through the second inductance element 52 and the switch 46 to the low potential terminal of the second side DC terminals is established. After the charging interval $T_S$, when the switch 46 is opened, the current slowly starts to commutate from the switch 46 to the second side transformer winding of the transformer 30 and the first inductance element 50. In this way, only a small amount of energy is transferred to the first side converter circuit, which can be absorbed there for pre-charging the first side capacitances. Since the commutation of the current is a gradual process, a voltage peak arises at the first MOSFET 45, which is limited to an acceptable value via the protection circuit 70, in particular via the second protection diode 74. In this way, the second side converter circuit 40 is protected against harmful voltage peaks during pre-charging the first side of the DC/DC converter.

The pre-charging process continues in an analogous manner, alternating between closing the switch 42 of the first MOSFET 41 and the switch 46 of the second MOSFET 45 for respective pre-charging intervals $T_S$. In between these pre-charging intervals, none of the switches 42 and 46 is closed, as depicted in FIG. 8. The pre-charging process is carried out until the voltage across the first side DC terminals 10 reaches a desired operating point. The energy absorbed by the protection circuit 70 is not lost, but re-fed back into the system in the topology of FIG. 6. It is also possible to connect the power source 80 to the low potential terminal of the pair of first side DC terminals 10, such that the energy absorbed by the protection circuit 70 helps directly in charging the first side of the DC/DC converter, thereby achieving a faster pre-charging of the first side.

The pre-charging interval $T_S$ may be chosen in a way to ensure that the protection circuit 70 is not over-loaded. Accordingly, the duration of the pre-charging depends on the values of the circuit components of the second side converter circuit 40, the transformer 30 as well as the dimensions of the protection circuit 30.

Figure 7A:
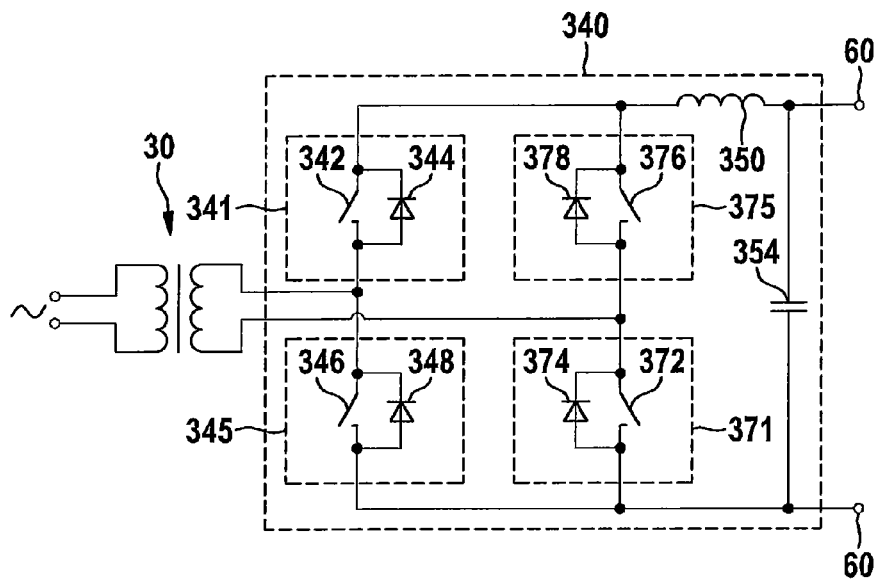
FIG. 7 shows circuit diagrams of the transformer and the second side converter circuit of DC/DC converters according to further exemplary embodiments of the invention.

FIG. 7 shows two alternatives for second side converter circuits that can be substituted for each of the second side converter circuits 40 and 140 shown in FIGS. 2 and 5. FIG. 7A shows a second side converter circuit 340, which comprises an H bridge circuit. An inductance element 350 and the H bridge circuit are coupled in series between the pair of second side DC terminals 60. A second side capacitor 354 is coupled in parallel with said series connection between the pair of second side DC terminals 60. The H bridge circuit comprises a first MOSFET 341, a second MOSFET 345, a third MOSFET 375 and a fourth MOSFET 371.

The second side converter circuit 340 can be controlled by a same control signal as the second side converter circuits 40 and 140. In particular, the control signal supplied to the first MOSFET 41 of the second side converter circuit 40, which controls the switch 42 thereof, is supplied to the first MOSFET 341 and the fourth MOSFET 371. Correspondingly, the control signal supplied to the second MOSFET 45 of the second side converter circuit 40, which controls the switch 46 thereof, is supplied to the second MOSFET 345 and the third MOSFET 375 of the second side converter circuit 340.

It is pointed out that the third and fourth MOSFETs 375 and 371 may be replaced with capacitors.

Figure 1:
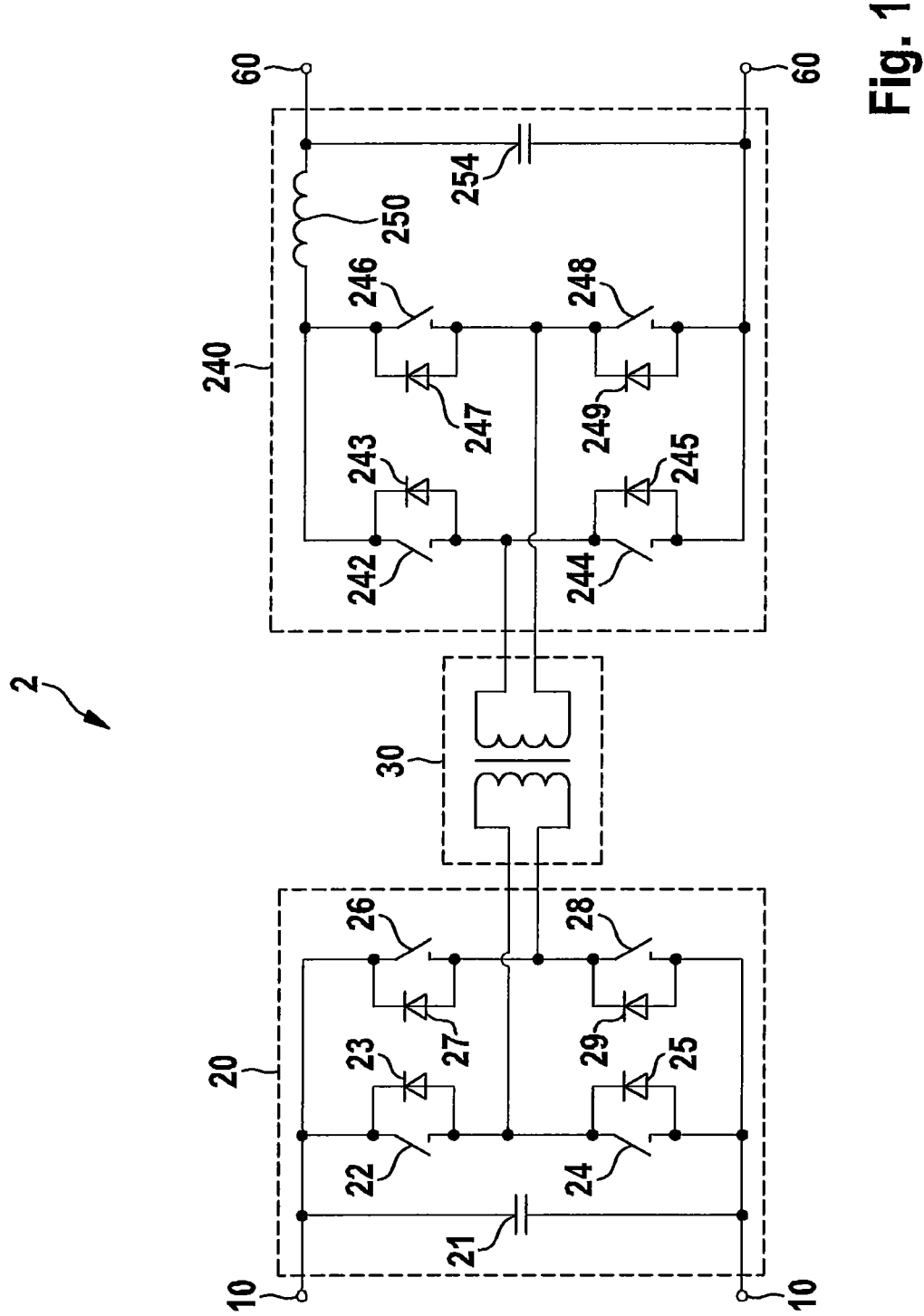
FIG. 1 shows a circuit diagram of a previous approach DC/DC converter.

The circuit structure of the second side converter circuit 340 corresponds to the circuit structure of the second side converter circuit 240 of FIG. 1. Accordingly, the second side converter circuit 240 of FIG. 1 may also be controlled in accordance with the invention and may therefore be part of an inventive DC/DC converter.

Figure 7B:
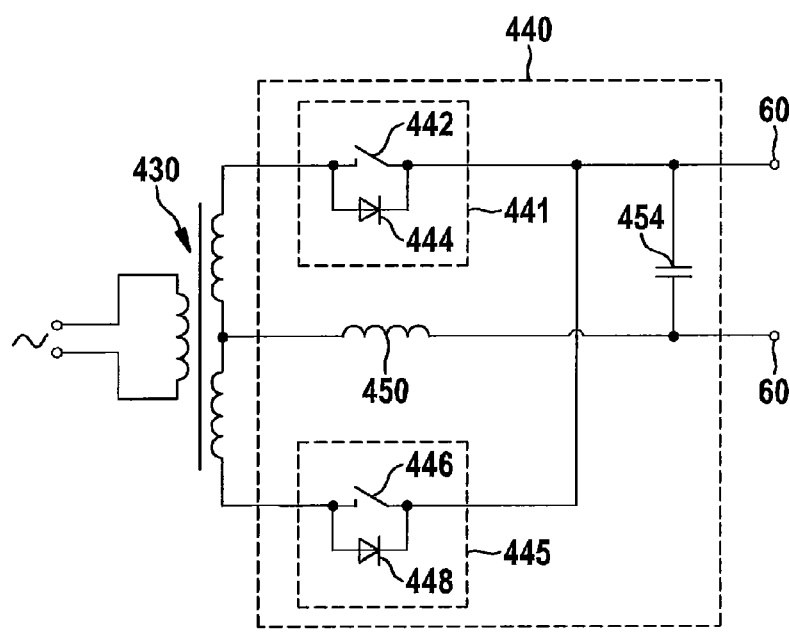

FIG. 7B shows another embodiment of a second side converter circuit 440, which is referred to as a transformer center tapped circuit. The second side converter circuit 440 works with another implementation of a transformer 430, which provides the center point of the second side transformer winding as a connection point for the second side converter circuit 440. This center point is coupled to the low potential terminal of the second side DC terminals 60 via an inductance element 450. The two ends of the second side transformer winding of the transformer 430 are coupled to the high potential terminal of the second side DC terminals 60 via the first MOSFET 441 and the second MOSFET 445 of the second side converter circuit 440, respectively. The second side converter circuit 440 further comprises a second side capacitor 454 coupled between the pair of second side DC terminals 60. It is also possible to flip the direction of the first and second MOSFETs 441 and 445 to achieve a reversed polarity at the pair of second side DC terminals 60.

Again, the second side converter circuit 440 can be controlled with the same control signals as the second side converter circuits 40 and 140 of FIGS. 2 and 5 if the transformer ratio of the transformer 30 equals the transformer ratio of the transformer 430 when looking at the total number of second side transformer windings thereof. In particular, the control signal for the first MOSFET 41 of the second side converter circuit 40 may equally be applied to the first MOSFET 441 of the second side converter circuit 440. Also, the control signal for the second MOSFET 45 of the second side converter circuit 40 may equally be applied to the second MOSFET 445 of the second side converter circuit 440. If differing transformer ratios are present, the control signals are adjusted accordingly.

It is further pointed out that, in an alternative embodiment, not shown throughout the figures, the first side converter circuit 20 may have an adjusted circuit topology. In particular, the third IGBT 26 and the third diode 27 may be replaced by a capacitor. Equally, the fourth IGBT 28 and the fourth diode 29 may be replaced by a capacitor. Accordingly, only the first and second IGBTs 22 and 24 would have to be supplied with the discussed control signals.

It is explicitly pointed out that the nomenclature of a first side and a second side, of a forward power transfer operation and a reverse power transfer operation are not intended to be limiting in any way for the exemplary embodiments described. They are used for distinguishing between the two operating directions of a bi-directional DC/DC converter. However, depending on the particular implementation of the invention and the particular circuit topology of the DC/DC converter, these power transfer directions may be called differently. Only the interdependencies between the control of the DC/DC converter and the circuit structure as described matters in this context. It is further explicitly pointed out that, within the scope of the invention, exemplary DC/DC converters are herewith also disclosed that are uni-directional DC/DC converters, wherein only one of the two power transfer directions is implemented. In other words, it is not a necessary feature of the embodiments described that both the control of FIG. 3 for one power transfer direction and the control of FIG. 4 for the other power transfer direction are implemented. In case only one of the power transfer directions is implemented, some of the circuit elements may be eliminated from the DC/DC converter. As an example, should only the power transfer from the pair of first side DC terminals 10 to the pair of second side DC terminals 60 be implemented and no reverse power transfer be required for the particular application, the first to fourth diodes 23, 25, 27 and 29 could be dispensed with.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A galvanically isolated DC/DC converter, comprising:
at least one first side converter circuit coupled between a pair of first side DC terminals, the first side converter circuit having at least a first and a second switching element, with each of the first and second switching elements comprising a switch and a diode connected in parallel, and
at least one second side converter circuit coupled between a pair of second side DC terminals,
wherein, when the DC/DC converter is in power transfer operation from the pair of second side DC terminals to the pair of first side DC terminals, the second side converter circuit is adapted to alternate between two power transfer states, wherein a conductive state of the diode of one of the first and second switching elements is the result of one of the two power transfer states, with the first side converter circuit being controlled such that the switch of the respectively other of the first and second switching elements is closed for an adaptation interval ($T_P$) prior to a beginning of the one of the two power transfer states,
wherein the first side converter circuit is controlled such that the adaptation interval ($T_P$) ends a preset commutation time ($T_K$) before the beginning of the one of the two power transfer states, and
wherein the preset commutation time ($T_K$) is chosen such that the conductive state of the diode of the one of the first and second switching elements is present at the beginning of the one of the two power transfer states.

2. The galvanically isolated DC/DC converter according to claim 1, wherein the first side converter circuit is an H bridge circuit, which comprises the first and second switching elements and further comprises a third and a fourth switching element, with each of the third and fourth switching elements comprising a switch and a diode in parallel, wherein a conductive state of the diodes of two of the first to fourth switching elements is the result of one of the two power transfer states, with the first side converter circuit being controlled such that the switches of the respectively other two of the first to fourth switching elements are closed for the adaptation interval ($T_P$) prior to the beginning of the one of the two power transfer states.

3. The galvanically isolated DC/DC converter according to claim 1, wherein the second side converter circuit is adapted to be in a state of no power transfer between the two power transfer states, with the adaptation interval ($T_P$) being during the state of no power transfer.

4. The galvanically isolated DC/DC converter according to claim 1, wherein the adaptation interval ($T_P$) has a preset duration.

5. The galvanically isolated DC/DC converter according to claim 1, wherein a duration of the adaptation interval ($T_P$) is dependent on the operating point of the DC/DC converter.

6. The galvanically isolated DC/DC converter according to claim 1, wherein each of the switches of the first side converter circuit is an insulated-gate bipolar transistor.

7. The galvanically isolated DC/DC converter according to claim 1, wherein the first side converter circuit has voltage source characteristics.

8. The galvanically isolated DC/DC converter according to claim 1, wherein the second side converter circuit has current source characteristics.

9. The galvanically isolated DC/DC converter according to claim 1, wherein the second side converter circuit has two parallel branches between the pair of second side DC terminals, each branch comprising an inductance element and a second side switching element.

10. The galvanically isolated DC/DC converter according to claim 9, wherein each of the second side switching elements is a MOSFET.

11. The galvanically isolated DC/DC converter according to claim 1, wherein the second side converter circuit is an H bridge circuit or a transformer center tapped circuit having at least two second side switching elements.

12. The galvanically isolated DC/DC converter according to claim 1, wherein the second side converter circuit has at least two second side switching elements, with each of a first one and a second one of the second side switching elements comprising a switch and a diode connected in parallel,
wherein, when the DC/DC converter is in forward power transfer operation from the pair of first side DC terminals to the pair of second side DC terminals, the diodes of the first one and the second one of the second side switching elements are alternately in a conductive state, with each of the first one and the second one of the second side switching elements being controlled such that a closed state of the respective switch extends beyond a transitioning of the diode of the same second side switching element from the conductive state to a blocking state.

13. The galvanically isolated DC/DC converter according to claim 12, wherein the respective switch of each of the first one and the second one of the second side switching elements is controlled to condition a slope of a discharge current of the diode of the same second side switching element during the transitioning thereof from the conductive state to the blocking state.

14. The galvanically isolated DC/DC converter according to claim 12, wherein each of the first one and the second one of the second side switching elements is controlled such that the respective switch is in the conductive state during substantially the whole time the diode of the same second side switching element is in the conductive state.

15. The galvanically isolated DC/DC converter according to claim 12, wherein the first side converter circuit is adapted to alternate between two forward power transfer states (PWM1/4, PWM2/3), wherein each forward power transfer state leads to the conductive state of one of the diodes of the first one and the second one of the second side switching elements, with each of the first one and the second one of the second side switching elements being controlled such that the respective switch is opened a preset lag time ($T_N$) after the respective one of the two forward power transfer states is entered that leads to the conductive state of the diode of the other second side switching element.

16. The galvanically isolated DC/DC converter according to claim 12, wherein the first side converter circuit is adapted to alternate between two forward power transfer states (PWM1/4, PWM2/3), wherein each forward power transfer state leads to the conductive state of one of the diodes of the first one and the second one of the second side switching elements, with each of the first one and the second one of the second side switching elements being controlled such that the respective switch is closed a preset delay time ($T_V$) after the respective one of the two forward power transfer states is entered that leads to the conductive state of the diode of the same second side switching element.

17. The galvanically isolated DC/DC converter according to claim 16, wherein the preset delay time ($T_V$) is greater than the preset lag time ($T_N$).

18. The galvanically isolated DC/DC converter according to claim 1, wherein the second side converter circuit is coupled to a protection circuit.

19. The galvanically isolated DC/DC converter according to claim 18, wherein the second side converter circuit comprises two second side switching elements and the protection circuit comprises a voltage source and two protection diodes coupled to the voltage source, with each of the second side switching elements being coupled to one of the two protection diodes.

20. The galvanically isolated DC/DC converter according to claim 19, wherein the voltage source is coupled to one of the pair of second side DC terminals or to one of the pair of first side DC terminals.

21. The galvanically isolated DC/DC converter according to claim 1, wherein the at least one first side converter circuit is a plurality of first side converter circuits connected in series between the pair of first side DC terminals and wherein the at least one second side converter circuit is a plurality of second side converter circuits connected in parallel between the pair of second side DC terminals.

22. The galvanically isolated DC/DC converter according to claim 21 comprising a plurality of transformers, with each transformer coupling one of the first side converter circuits to one of the second side converter circuits.

23. The galvanically isolated DC/DC converter according to claim 1, wherein, in operation, a desired operating voltage across the pair of first side DC terminals is at least 10 times greater than an operating voltage across the pair of second side DC terminals.

24. The galvanically isolated DC/DC converter according to claim 1, wherein, in operation, a desired operating voltage across the pair of first side DC terminals is between 400V and 800V, preferably between 500V and 700V.

25. The galvanically isolated DC/DC converter according to claim 1, wherein, in operation, an operating voltage across the pair of second side DC terminals is between 10V and 40V, preferably between 20V and 30V.

26. A method of controlling a galvanically isolated DC/DC converter, which comprises at least one first side converter circuit coupled between a pair of first side DC terminals and at least one second side converter circuit coupled between a pair of second side DC terminals, wherein the first side converter circuit has at least a first and a second switching element, with each of the first and second switching elements comprising a switch and a diode connected in parallel, and wherein the second side converter circuit is controlled to alternate between two power transfer states for transferring power from the pair of second side DC terminals to the pair of first side DC terminals, the method comprising the steps of:
 (a) operating the second side converter circuit in one of the two power transfer states, with the one of the two power transfer states leading to the diode of a particular one of the switching elements to be in a conductive state,
 (b) ending the one of the two power transfer states and putting the second side converter circuit in a state of no power transfer,
 (c) closing the switch of the particular one of the switching elements for an adaptation interval ($T_P$), and
 (d) putting the second side converter circuit in the other one of the two power transfer states, with the other one of the two power transfer states leading to the diode of the other one of the switching elements to be in a conductive state,
 wherein step (d) takes place a preset commutation time ($T_K$) after an end of the adaptation interval $T_P$) and wherein the preset commutation time ($T_K$) is chosen such that the conductive state of the diode of the other one of the switching elements is present at the beginning of the other one of the two power transfer states.

27. The method according to claim 26, wherein an amount of power transfer is controlled by a duration of the two power transfer states.

* * * * *